Patented Oct. 11, 1938

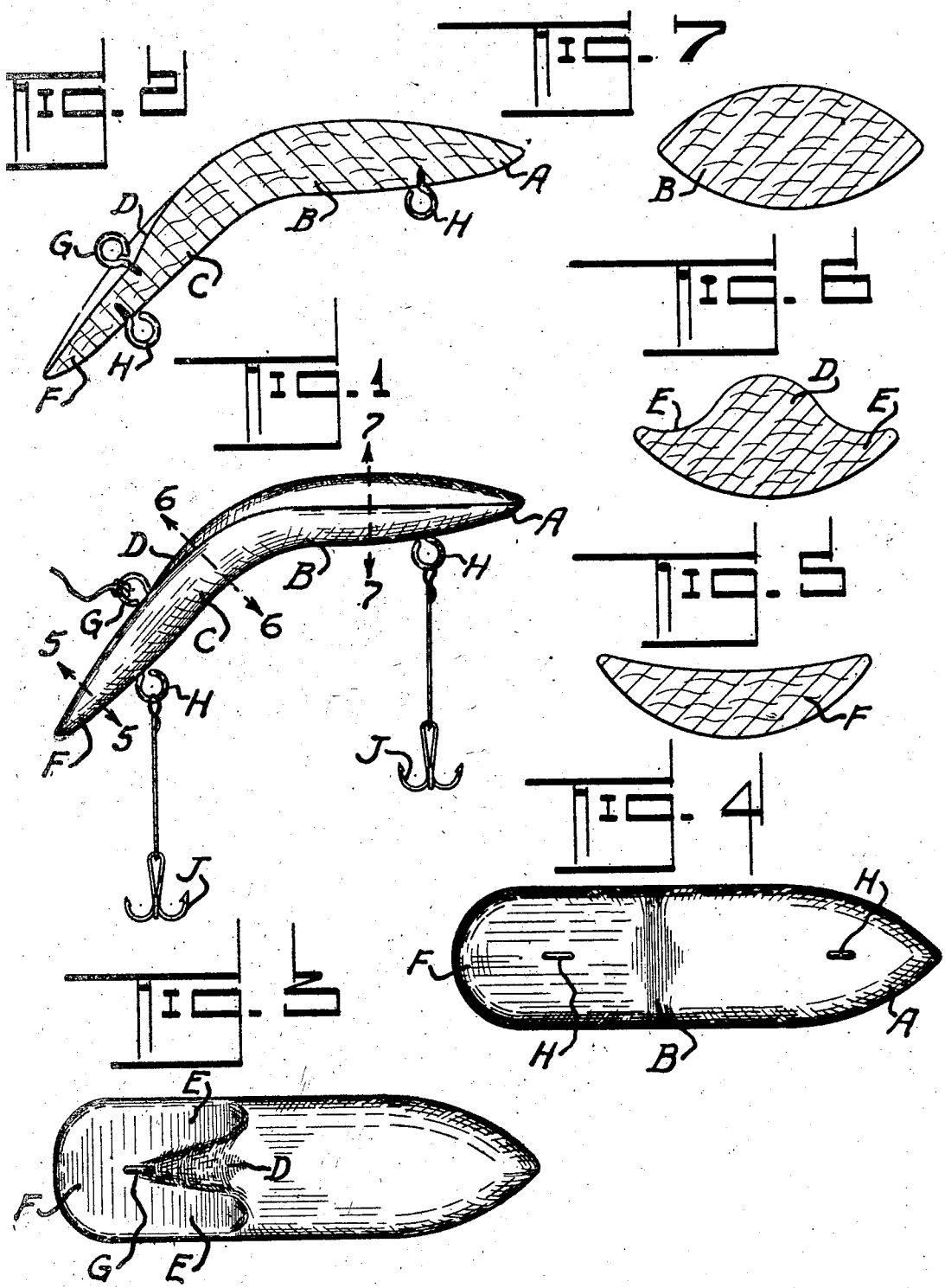

2,133,032

UNITED STATES PATENT OFFICE 2,133,032

FISH LURE

John L. Martz, Detroit, Mich.

Application July 19, 1937, Serial No. 154,355

2 Claims. (Cl. 43—46)

The present invention relates to improvements in the art of fishing equipment and has more particular reference to a certain new and improved lure having a special construction whereby when it is used the effect thereof for increasing the attraction of various species of fish will simulate the action of a living water object, and in this manner a most desirable bait of the artificial class is thereby unquestionably attained.

With the foregoing in mind, it will become readily apparent that the invention possesses further advantages, all of which will be clearly revealed during the course of the following detailed description, illustrated throughout the accompanying drawing, and more particularly pointed out in the appended claims.

With reference to the drawing:

Figure 1 is a side elevation of the complete invention; and Figure 2 is a longitudinal section through the center thereof.

Figure 3 is a top plan view of the invention; and Figure 4 is a bottom plan view thereof.

Figures 5 to 7 inclusive are enlarged transverse sections; and Figure 5 being taken upon line 5—5 of Figure 1; Figure 6 upon line 6—6 of Figure 1; and Figure 7 upon line 7—7 of Figure 1.

The invention will be described and claimed in its approximate position when the same is actually in normal action within the water.

The body of this device may be composed of wood, metal, or in fact any suitable material may be used for this purpose having water-proof qualities, and first referring more particularly to Figures 1 and 2, it is understood that said body comprises a horizontally disposed rear portion having a tapered end A which is gradually enlarged to the forward position of B, and Figure 7 shows a cross section of the greatest proportion of the rear portion of the body.

At the position of B the body is obliquely deflected as at C and downwardly with respect to position B, and a cross section of this portion of the body is indicated in Figure 6, and it is further seen therein that rib D is provided where located and extending as shown in Figure 2, and upon each side of said rib is cavity E. Rib D and the particular relation therewith of cavities E mutually contribute to the life-like action of the lure in conjunction with the deflected body thereof, also the cross section shown in Figure 5, as at F. See Figure 3.

Conventional eyelet G is provided where shown for connecting the lure with a suitable line, and likewise conventional eyelets H are provided where indicated for respective hooks J.

It is now understood that in trolling the lure the same will wiggle in rapid succession and simultaneous with the wiggling action it will follow a pronounced zigzag course, consequently it is unquestionably apparent that by this combination action, the strongest attraction as a bait for various species of fish is thereby accomplished.

Having thus fully described my invention, what I claim as new is:

1. In a fish lure, a body having a horizontally disposed tranversely oval rear portion, tapering toward the rear end thereof, the forward portion of said body being obliquely deflected downwardly from the said rear portion, a rib midway the width of the forward portion of said body extending longitudinally of the body and terminating in spaced relation to the front end thereof, the surface between the rib and the front end being concaved transversely, and a cavity upon each side of said rib extending longitudinally thereof and merging into the concaved surface extending transversely of the body between the rib and the front end of the body.

2. In a fish lure, a body, said body comprising a rear portion oval in cross section and tapering toward its rear end, a forward portion for said body obliquely deflected downwardly from the said rear portion, a rib rising from the top surface of the said forward portion and extending longitudinally thereof and tapered toward the front end thereof and terminating substantially midway its length, the upper surface of the said front portion between the rib and the front end of the body being concaved transversely for the full width of the body and between the rib and opposite side edges of the body being concaved transversely to provide longitudinally extending channels at opposite sides of the rib merging into the concaved surface between the rib and the front end of the body, and line-attaching means at the front end of said rib and in spaced relation to the front end of the body.

JOHN L. MARTZ.